March 16, 1971 K. L. ROHRBOUGH 3,570,286
THEFT REDUCER LOCK MEANS
Filed Aug. 30, 1968
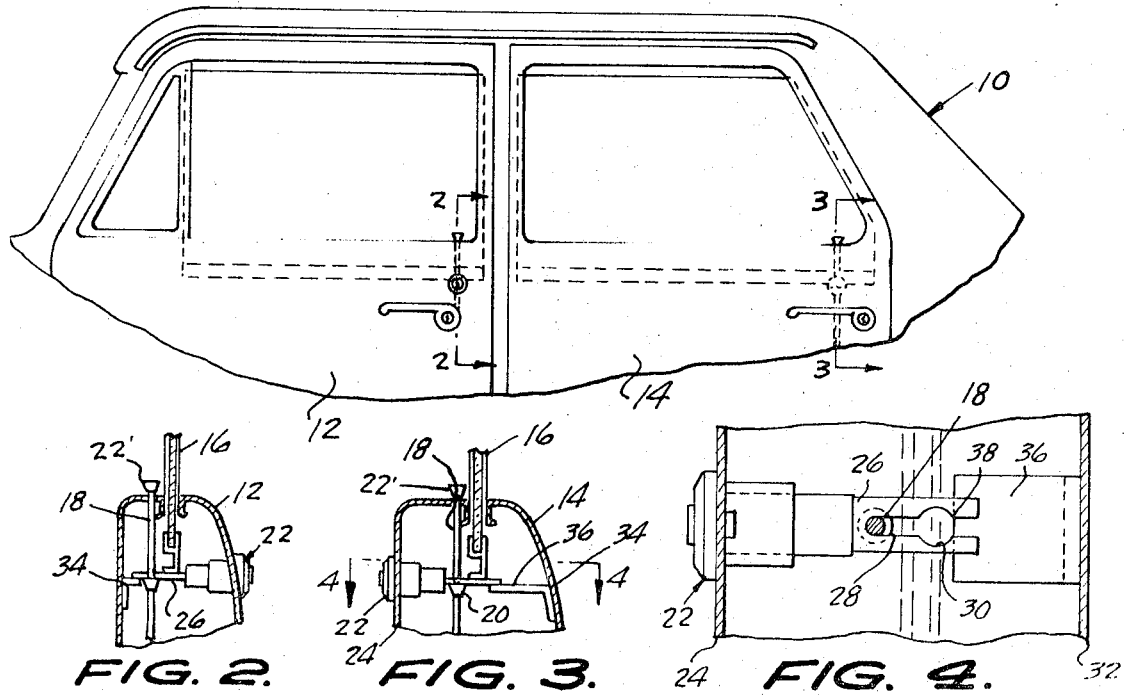
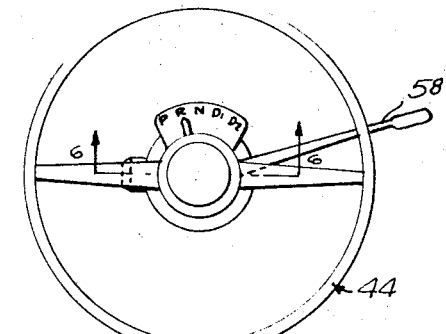
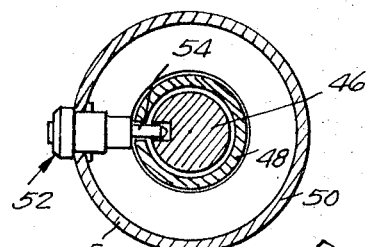
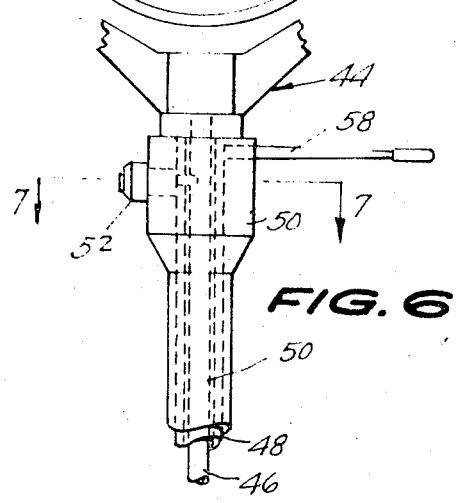
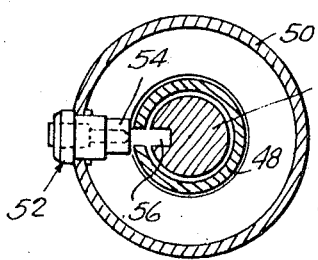
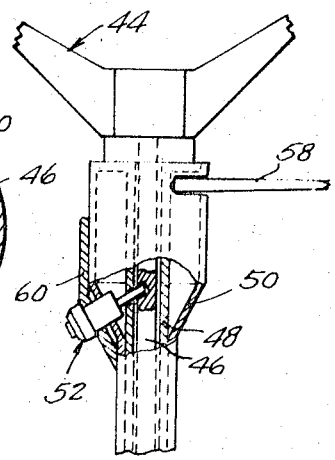
INVENTOR.
KENNETH L. ROHRBOUGH,
BY
*Berman, Davidson & Berman*
ATTORNEYS.

United States Patent Office 3,570,286
Patented Mar. 16, 1971

3,570,286
THEFT REDUCER LOCK MEANS
Kenneth L. Rohrbough, 1117 Montgomery St.,
St. Louis, Mo. 63106
Filed Aug. 30, 1968, Ser. No. 756,631
Int. Cl. G05g 5/00
U.S. Cl. 70—181        5 Claims

ABSTRACT OF THE DISCLOSURE

A locking device for use with a vehicle and the like, comprising a key push lock secured to the door of a vehicle with extension means adapted to extend over the rod stop of the inner door lock push-down stem, and extension support means disposed on said door, with said extension being supported on said extension support means, and adapted to pass under the raised window in said door. The present device is further provided with a key push lock attached to the locking housing, which in turn is attached to the steering column housing. The key push lock has at its inner end a lock pin which extends forward into a locking hole to lock the steering column.

---

The present invention relates to locks for automobile doors and locks for locking the steering column of a vehicle in order to prevent theft of the vehicle.

It is well known that there is a large amount of unauthorized use of vehicles and theft of vehicles when they are parked and left alone by the owner.

It is an object of the present invention to provide a key push lock that can be attached to the inner side of In operation, brush 10 is dipped in water or a soapy outer side of the vehicle door, so that the push-down button commonly used on vehicles in order to lock the doors from the inside can be prevented from being raised by a party after they have broken into the vent window of a vehicle, for example.

It is another object of the present invention to provide a key push lock for a vehicle that can be utilized to prevent the pushdown-lock on the inner side of the vehicle door from being raised without the use of a key, even though the vehicle may be broken into.

Yet another object of the present invention is to provide a push key lock with extension means thereon which, not only prevents the raising of a push-down locking item in a vehicle, but also prevents the lowering of the window in the door without the use of a key.

Another object of the present invention is to provide a push key locking device for utilization with a steering column in a shift lever housing which has a locking pin thereon, which fits into a locking hole so that the wheels of the vehicle cannot be turned without the use of a key, to thus prevent the theft and appropriation of a vehicle without the authorized consent of the owner after he has parked the car or vehicle.

Various other objects and advantages of the present invention will be readily apparent from the following detailed description, when considered in connection with the accompanying drawing forming a part thereof, and in which:

FIG. 1 is a side view of a portion of a vehicle utilizing the locking means for the door of the vehicle which embodies the present invention;

FIG. 2 is a section taken along the lines 2—2 of FIG. 1, but on an enlarged scale;

FIG. 3 is a section taken along the lines 3—3 of FIG. 1, but on an enlarged scale, and showing the locking device disposed on the inner side of the door;

FIG. 4 is an enlarged section taken along the lines 4—4 of FIG. 3;

FIG. 5 is a plan view of a steering wheel and the steering column of the vehicle;

FIG. 6 is a fragmentary side view of the steering wheel and column shown in FIG. 5;

FIG. 7 is a section taken along the lines 7—7 of FIG. 6;

FIG. 8 is a view similar to FIG. 7, but showing the device in an unlocked position; and FIG. 9 is another modification of the invention shown in FIG. 6.

Referring now to the drawings, the reference numeral 10 generally designates a vehicle having a front door 12 and a back or rear door 14.

Referring to FIG. 3, it will be seen that the door 14 is of conventional configuration or structure and is hollow and is provided with a window or glass 16 therein that can be raised and lowered by well known window-raising mechanism, not forming part of this invention.

The door 14 is further provided with a push-down button or rod 18, with a rod stop 20 on its lower portion and an enlarged head or button 22' on its upper end. The push-down member 18 is also provided with lock means that do not form part of the invention and which prevent the door from being opened by turning the handle or operating the handle on the outside of the door, so that the door is locked from the inside.

A key push lock 22 is provided on the inner side 24 of the door, which key push lock is of well known construction and is provided with a key, not shown, for locking it. The inner end of the key push lock 22 is provided with an extension member 26 thereon, which member 26 is a flat plate with an elongated, narrow slot 28 therein, with an enlarged circular opening 30 formed in the central portion of the narrow, elongated slot 28, as best seen in FIG. 4. The outer side 32 of the door is provided with an L-shaped extension support member 34 secured thereto by any suitable means and provided with a horizontal leg 36 extending inwardly toward the key push lock 22.

Referring to FIG. 3, it will be noted that the push-down member or rod 18 and the lower portion of the window 16 are disposed between the key push lock 22 and the extension support member 34.

When it is desired to lock the door 14 after the push rod or member 18 is pushed downwardly into its locked position, as in the conventional vehicle, the key push lock 22 has its key inserted therein and it is pushed into a locking position. This is done after the window 16 has been fully raised, or after the window has been raised to, say, approximately one inch of its closed position to let the car ventilate. The locking of the key push lock causes the extension plate or member 26 to extend transversely across the hollow chamber within the door and so that its outer end 38 rests on the leg 36 of the support member 34. The movement of the extension 26 to its locking position shown in FIG. 4, will permit the stem 18 to be disposed within the narrow slot 28, as best seen in FIG. 4, but with the rod stop 20 disposed below the slot 28. It will further be noted that the rod stop 20 is larger than the narrow slot 28 so that it cannot be pulled upwardly. At this time, it will be further noted that the window 16 cannot be lowered because the extension 26 is disposed below the bottom edge of the window 16, so that the window-winding mechanism cannot be operated at this time unless a key is used to open the key push lock so that the extension member is again opened, at which time the enlarged circular opening 30 in the slot 28 is in alignment with the member 18, so that the rod stop 20 can then be raised through the circular opening 30 so that the stem can be moved upwardly to its unlocked position and the door can be opened.

In a four-door vehicle, the key push lock 22 would be disposed flush on the inner surface 24 of the door, with the exception of, say, the front door 12 on the driver's side.

In the door 12, the locking device is identical to that already described in connection with FIG. 3, except that the key push lock 22 is disposed on the outer side of the door and the extension support member 34 is secured to the inner side of the door. In this manner, the driver can lock the key push device from the outside of the vehicle.

Thus, the invention herein of the locking device prevents the vehicle doors from being opened without the use of the key, because the key push lock prevents raising of the stem 18 since extension member 26 extends across stop 20.

Referring to FIGS. 5 through 8, there is shown therein a steering wheel 44 of any conventional vehicle having a steering column 46 in a steering column housing 48, which in turn is disposed in a lock housing 50. The lock housing 50 is provided with a key push lock 52, having a lock pin 54 adapted to be pushed into a hole 56 extending through the steering column housing 48 and into the steering column 46. Referring to FIG. 7, the pin 54 is shown in its locked position therein extending into the steering column 46, so that the steering wheel and the column cannot be turned. In FIG. 8, the pin 54 is shown in in its unlocked position. It will be noted that the steering wheel is provided with a shift lever 58 of a conventional automatic type. The key push lock 52 is adjusted to the point that it can only be pushed in and locked and be effective when the gear shift lever is in reverse gear. Then the steering column is turned either to the left or the right to make sure that the front wheels of the vehicle are at an angle and then to the point where the lock pin 54 is in alignment with the locking hole. At that time, the key push lock is pushed in and the car is locked in reverse gear and also the front wheels are at an angle and not straight, so that it is lockproof and cannot be stolen.

The steering wheel illustrated in FIG. 9 is substantially the same as that described in connection with FIG. 6, except that key push lock 52 is disposed at an angle and a lock housing is disposed outwardly of the inner lock housing 50.

Thus, with the locking device of the present invention the vehicle doors are locked and cannot be unlocked without a key, even though the vent window may be opened by a car thief, and with the steering wheel also provided with key push lock means, the vehicle cannot be used without authorization of the owner and the theft and appropriation of vehicles is practically impossible.

Inasmuch as various changes may be made in the relative arrangement and form and location of the parts, without departing from the spirit of the invention, it is not meant to limit the invention, except by the scope of the appended claims.

What is claimed is:

1. In a vehicle door with spaced walls and a push-down locking rod with a rod stop and a roll-up window, a key push lock disposed on one of said walls with an axial extension, an extension support on the other wall to support said extension when said push lock is locked, said extension having slot means and extending transversely of said locking rod and window bottom to prevent movement thereof.

2. The device of claim 1 wherein said slot means is narrower than said rod stop to prevent upward movement of said rod when it is locked.

3. The device of claim 2 wherein said slot means is provided with an enlarged opening therein disposed in alignment with said rod stop when it is in an unlocked position.

4. The device of claim 3 wherein said extension is a horizontal plate and said slot means extends longitudinally of said plate.

5. The device of claim 4 wherein said extension support is an L-shaped bracket.

References Cited

UNITED STATES PATENTS

| | | | |
|---|---|---|---|
| 2,629,246 | 2/1953 | Schumann | 70—181 |
| 2,939,307 | 6/1960 | Trammell, Jr. | 70—181 |
| 3,054,282 | 9/1962 | Bacon | 70—264 |
| 3,288,524 | 11/1966 | Gordon | 296—146 |

MARVIN A. CHAMPION, Primary Examiner

R. L. WOLFE, Assistant Examiner

U.S. Cl. X.R.

70—185